(12) United States Patent
Jang et al.

(10) Patent No.: US 7,869,617 B2
(45) Date of Patent: Jan. 11, 2011

(54) SPEAKER FOR MOBILE COMMUNICATION TERMINAL

(75) Inventors: Bo-Eun Jang, Daegu (KR); Sung-Sik Kim, Ansan-si (KR)

(73) Assignees: Samsung Electronics Co., Ltd., Suwon-si (KR); Bujeon Co., Ltd., Ansan-si (KR)

( * ) Notice: Subject to any disclaimer, the term of this patent is extended or adjusted under 35 U.S.C. 154(b) by 1142 days.

(21) Appl. No.: 11/505,993

(22) Filed: Aug. 18, 2006

(65) Prior Publication Data

US 2007/0116321 A1 May 24, 2007

(30) Foreign Application Priority Data

Nov. 24, 2005  (KR) .................. 20-2005-0033231 U

(51) Int. Cl.
*H04R 25/00* (2006.01)

(52) U.S. Cl. .................. 381/396; 381/333; 381/388

(58) Field of Classification Search ......... 381/333–334, 381/386, 388, 392, 395, 189, 396
See application file for complete search history.

(56) References Cited

U.S. PATENT DOCUMENTS

| | | | |
|---|---|---|---|
| 5,974,157 A | 10/1999 | Tajima et al. | |
| 6,023,518 A * | 2/2000 | Kuwabara et al. | 381/396 |
| 6,370,257 B1 * | 4/2002 | Bleim et al. | 381/396 |
| 6,628,800 B2 * | 9/2003 | Tajima | 381/396 |
| 7,142,686 B2 * | 11/2006 | Furuya et al. | 381/396 |
| 7,324,658 B2 * | 1/2008 | Kobayashi | 381/396 |
| 7,567,680 B2 * | 7/2009 | Murray et al. | 381/396 |
| 2003/0003945 A1 | 1/2003 | Saiki et al. | |

FOREIGN PATENT DOCUMENTS

| | | |
|---|---|---|
| CN | 1262592 | 8/2000 |
| CN | 1420672 | 5/2003 |
| EP | 1 389 032 A2 | 2/2004 |
| GB | 2 408 405 A | 5/2005 |
| WO | WO 2004/030402 A1 | 4/2004 |

OTHER PUBLICATIONS

Kinsler, "Resonators and Filters", Fundamental of Acoustics, Jan. 1, 1962, pp. 186-216, XP-002065613.

* cited by examiner

*Primary Examiner*—Suhan Ni
(74) *Attorney, Agent, or Firm*—Roylance, Abrams, Berdo & Goodman, L.L.P.

(57) ABSTRACT

A speaker for a mobile communication terminal is provided. The speaker with an upper case, a frame, a vibration plate, a voice coil, a yoke, a magnet, a top plate and a printed circuit board (PCB) includes a housing for accommodating the vibration plate, the voice coil, the yoke, the magnet and the top plate, the housing being formed by coupling the upper case and the frame, a sound emission hole formed in one side surface of the housing, a sound pressure adjustment hole formed by penetrating the upper case, and a resonance space formed in an outer circumference of the upper case. In the speaker, it is possible to elevate degree of space utilization in the mobile communication terminal, to easily manufacture a mobile communication terminal which parallels the trend toward miniaturization, slimness and lightness, to improve the characteristics of low frequency sound, and thus to improve sound quality.

10 Claims, 5 Drawing Sheets

SPEAKER FOR MOBILE COMMUNICATION TERMINAL

CROSS-REFERENCE TO RELATED APPLICATION

This application claims the priority under 35 U.S.C. §119(a) of a Korean patent application entitled "Speaker For Mobile Communication Terminal" filed in the Korean Intellectual Property Office on Nov. 24, 2005 and assigned Serial No. 2005-33231, the entire contents of which are hereby incorporated by reference.

BACKGROUND OF THE INVENTION

1. Field of the Invention

The present invention relates to a speaker for a mobile communication terminal. More particularly, the present invention relates to a speaker for a mobile communication terminal, in which a sound emission hole and a sound pressure adjustment hole are formed therethrough so as to enable sound pressure (ring back tone) to be simultaneously emitted to one side surface and an upper side of the terminal, and a resonance space is further formed, so that it is possible to elevate the degree of space utilization in the mobile communication terminal, to easily manufacture a mobile communication terminal which parallels the trend toward miniaturization, slimness and lightness, to improve the characteristics of low frequency sound of the sound pressure (ring back tone), and thus to improve the sound quality.

2. Description of the Related Art

In general, a mobile communication terminal comprises a buzzer for generating a ringing sound, a receiver for generating a received communication sound, and a vibration motor for causing vibration of the terminal. Since the buzzer can simply reproduce an alarm or homophony, there is a limitation in satisfying various demands of consumers.

FIGS. 1A and 1B are perspective views illustrating a conventional mobile communication terminal equipped with a speaker. As illustrated in FIG. 1A, a small speaker has been recently used instead of the buzzer. A small speaker used for a terminal comprises a sound generator 11 within a cover (folder) of the terminal equipped with a liquid crystal display (LCD) window, wherein the sound generator 11 comprises a vibration plate, a voice coil, a magnet, a top plate, and so on. An emission hole 12 for emitting a ring back tone generated by the small speaker is formed through the cover (folder) on the outer side thereof. Otherwise, as illustrated in FIG. 1B, the emission hole 12 is formed through the cover (folder) on the inside thereof, which comes in contact with a keypad, while having the same orientation as that of a receiver (not shown).

In the conventional mobile communication terminal as described above, it is difficult to select a mounting location and a mounting direction for the speaker, and a relatively large space is required in order to mount the speaker as compared with the buzzer. Therefore, it is not sufficient for the speaker to be applied to a small, slim and light mobile communication terminal. Further, since the emission hole 12 of the mobile communication terminal in FIG. 1A is formed in an outer side of the cover (folder), if it is covered by the human body, clothes, and so on, the amplitude of the emitted ring back tone is reduced. Therefore, a user may not recognize the ring back tone.

Further, since the emission hole 12 of the conventional mobile communication terminal in FIG. 1B is formed on the inner side of the cover (folder), which comes in contact with the keypad, while having the same orientation as that of the receiver, the amplitude of the emitted ring back tone may be reduced as the emission hole 12 is covered even when the cover (folder) is in a closed state, for example, the inner side surface of the cover (folder) is in contact with the keypad.

In order to solve the problems as described above, a terminal receiver unit equipped with a sound emission hole has been proposed. FIG. 2 is a sectional view schematically illustrating a conventional speaker for a mobile communication terminal, As illustrated in FIG. 2, the terminal receiver unit comprises a frame 22, an upper case 21, a top plate 27, a yoke 25, a printed circuit board (PCB) 28, a magnet 26, a vibration plate 23 and a coil 24.

The upper case 21 is coupled with the frame 22 to form a sound emission hole 20 for emitting a ring back tone of a predetermined amplitude, and accommodates the vibration plate 23, the top plate 27, the magnet 26 and the yoke 25. The vibration plate 23, the top plate 27, the magnet 26 and the yoke 25 are combined to form a speaker function unit for generating sound pressure (a ring back tone). In detail, the sound pressure (ring back tone) is generated by the vibration plate 23 of the elements constituting the speaker function unit. The PCB 28 is mounted on the outer circumference of the frame 22 to apply electric current to the coil 24, and the coil 24 generates electromagnetic force by using the applied electric current, so that the vibration plate 23 vibrates.

The terminal receiver unit having the construction as described above has the sound emission hole 20 and may be provided in a direction along wall surfaces as in the case of the existing buzzer when the terminal receiver unit is clamped in a terminal, so that it is possible to improve the degree of space utilization. Further, the conventional emission hole 12 formed on the outer surface or inner surface of the cover (folder) is disposed in the side surface of the cover (folder), so that the sound pressure (ring back tone) due to vibration of the vibration plate 23 is emitted to the side surface. Accordingly, it is possible to improve the straightness of the sound and to enhance the denseness of the sound pressure (ring back tone) and so forth.

However, in the conventional terminal receiver unit, the sound pressure (ring back tone) generated by the up and down vibration of the vibration plate 23 is reflected from the inner surface of the upper case 21, affects the vibration plate 23 during the up and down vibration, and reduces the amplitude of the vibration plate 23 during vibration. Therefore, only high frequency sound of the sound pressure (ring back tone) is generated and thus the characteristics of low frequency sound cannot be vividly realized. Consequently, the high and low frequency sounds of the sound pressure (ring back tone) emitted through the sound emission hole 20 are not harmonized and a homophony state, in which only one of the high and low frequency sounds is emitted, is caused.

Accordingly, there is a need for an apparatus and method for improving the sound quality of a speaker in a mobile terminal.

SUMMARY OF THE INVENTION

An aspect of exemplary embodiments of the present invention is to address at least the above problems and/or disadvantages and to provide at least the advantages described below. Accordingly, an object of the present invention is to provide a speaker suitable for a mobile communication terminal which parallels the trend toward the miniaturization, slimness and lightness.

An object of the present invention is to provide a speaker for a mobile communication terminal, which can improve the characteristics of low frequency sound of sound pressure (ring back tone) by means of a sound emission hole, a sound pressure adjustment hole and a resonance space.

In order to accomplish the aforementioned object, according to one aspect of exemplary embodiments of the present, a speaker for a mobile communication terminal is provided. The speaker comprises an upper case, a frame, a vibration plate, a voice coil, a yoke, a magnet, a top plate and a printed circuit board (PCB). The speaker further comprise a housing for accommodating the vibration plate, the voice coil, the yoke, the magnet and the top plate, the housing being formed by coupling the upper case and the frame, a sound emission hole formed in one side surface of the housing, a sound pressure adjustment hole formed by penetrating the upper case, and a resonance space formed in an outer circumference of the upper case in order to surround the sound pressure adjustment hole.

Other aspects, advantages, and salient features of the invention will become apparent to those skilled in the art from the following detailed description, which, taken in conjunction with the accompanying drawings, discloses exemplary embodiments of the invention.

BRIEF DESCRIPTION OF THE DRAWINGS

The above and other objects, features and advantages of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
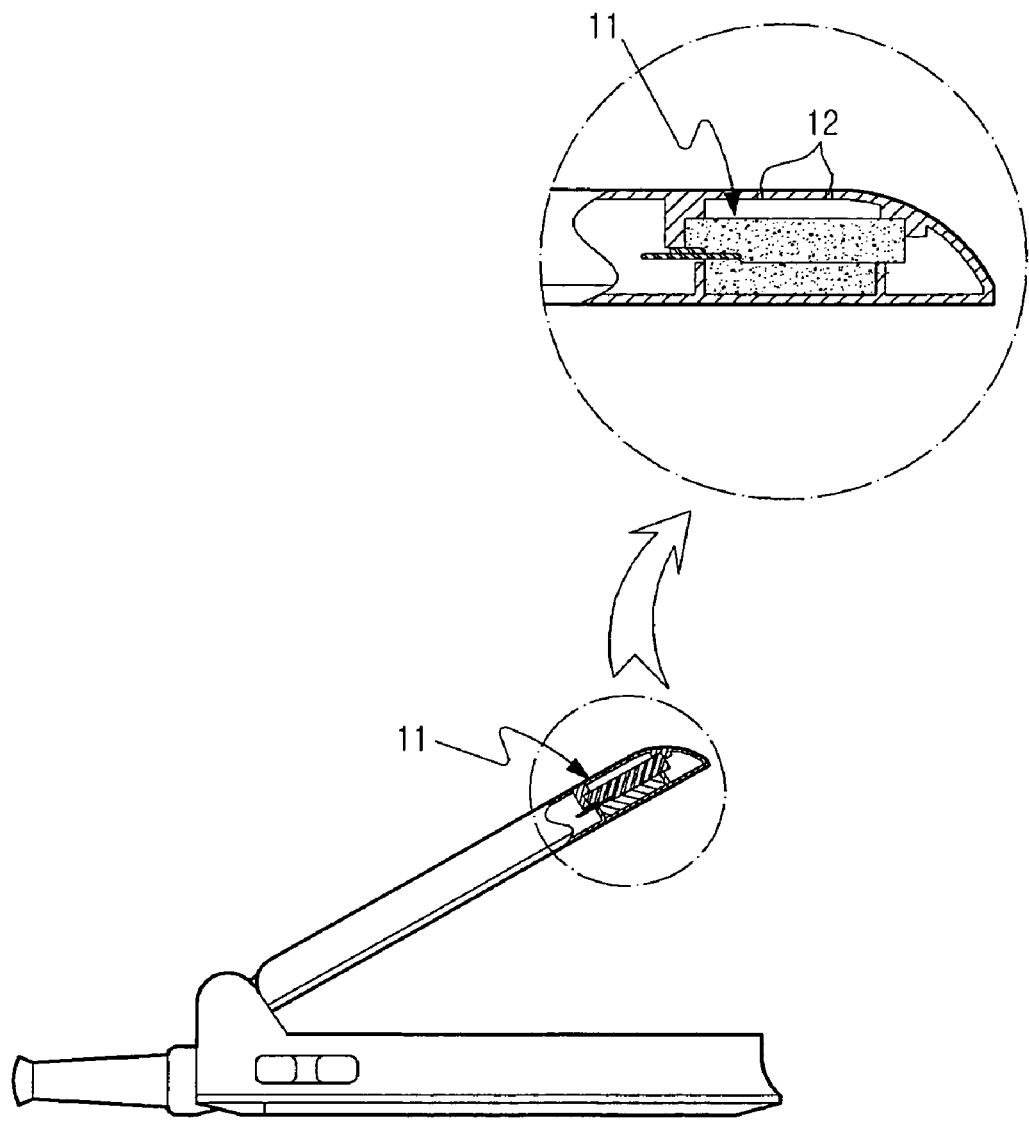
FIGS. 1A and 1B are perspective views illustrating a conventional mobile communication terminal equipped with a speaker.
Figure 1B:
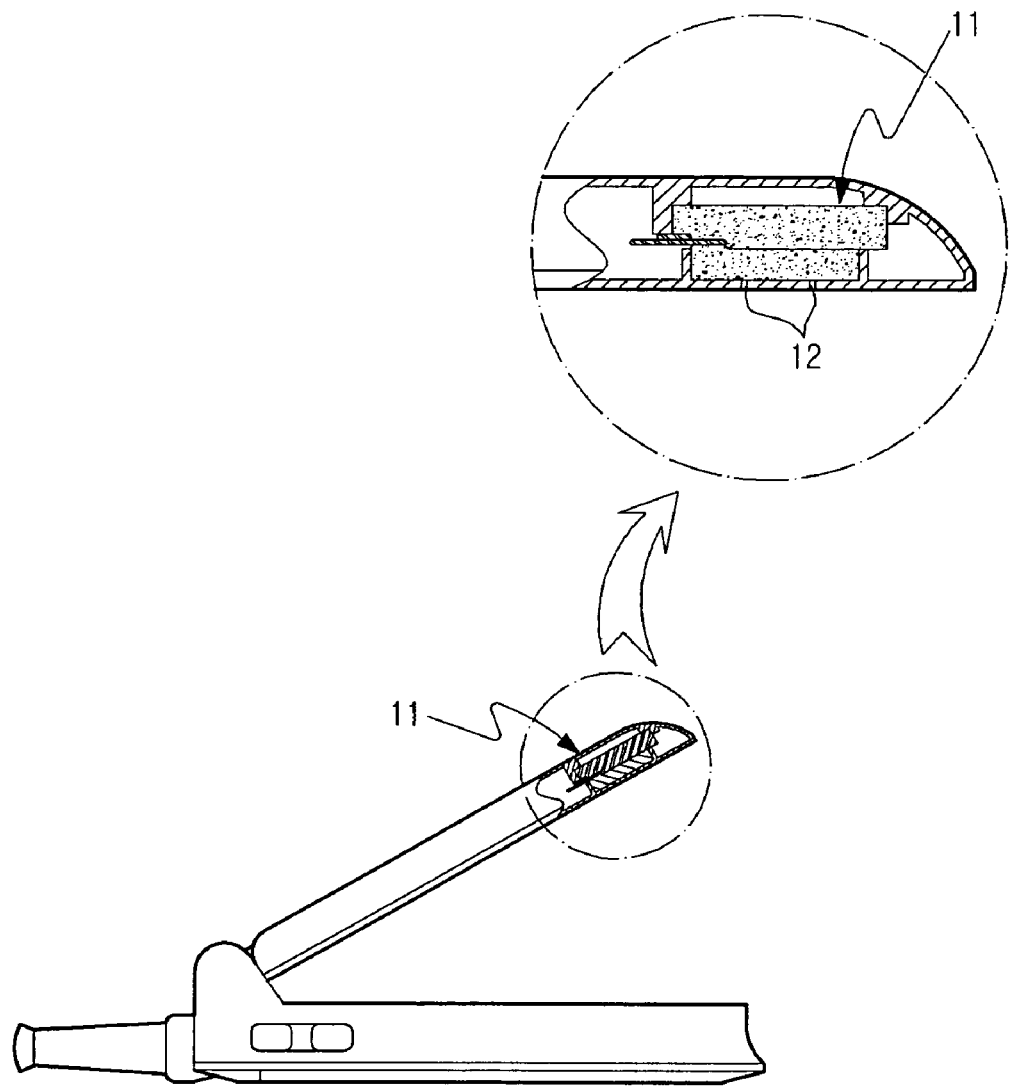
Figure 2:
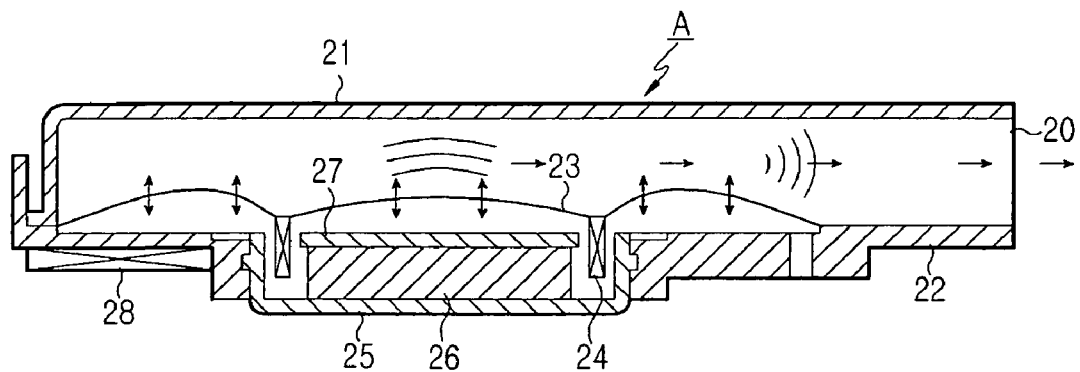
FIG. 2 is a sectional view schematically illustrating a conventional speaker for a mobile communication terminal.
Figure 3:
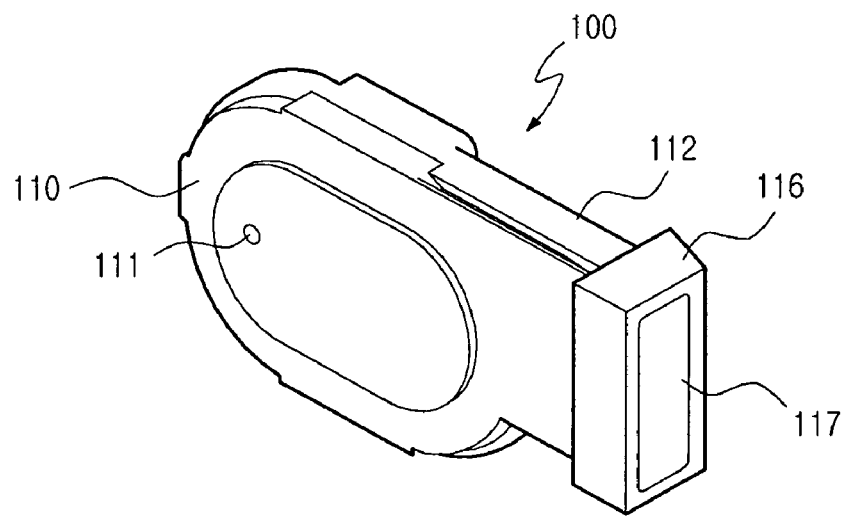
FIG. 3 is a perspective view schematically illustrating a speaker for a mobile communication terminal according to an exemplary embodiment of the present invention.
Figure 4:
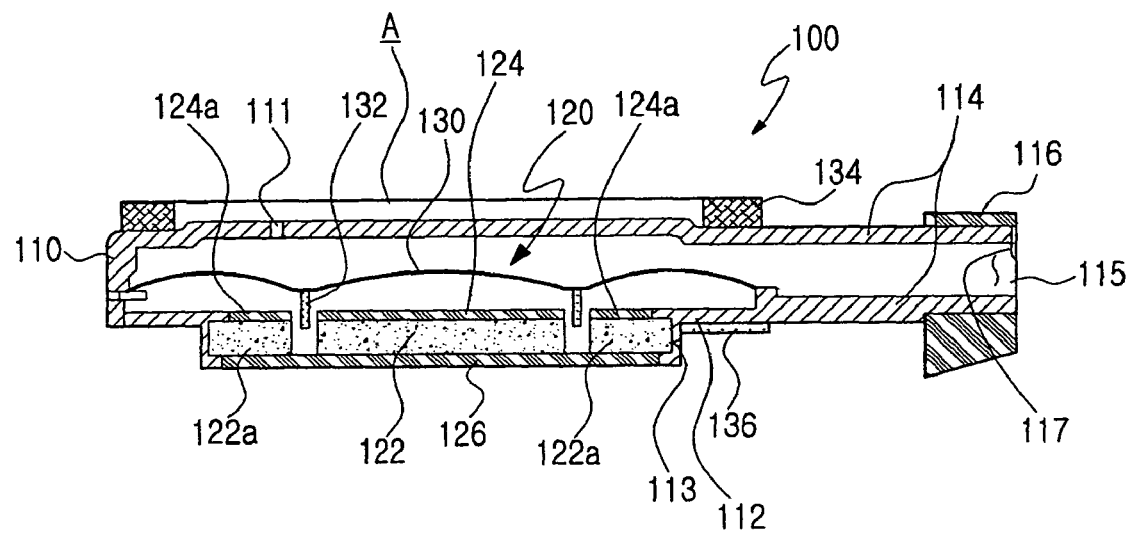
FIG. 4 is a sectional view of the speaker for a mobile communication terminal as illustrated in FIG. 3 according to an exemplary embodiment of the present invention.
Figure 5:
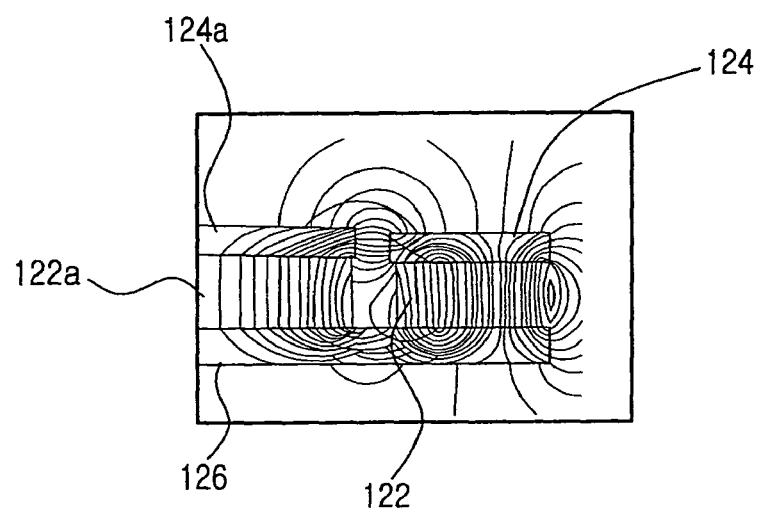
FIG. 5 is a state diagram illustrating flow of magnetic force between a magnet and a top plate of the speaker as illustrated in FIG. 3 according to an exemplary embodiment of the present invention.

FIG. 3 is a perspective view schematically illustrating a speaker for a mobile communication terminal according to an exemplary embodiment of the present invention, FIG. 4 is a sectional view of the speaker for a mobile communication terminal as illustrated in FIG. 3 according to an exemplary embodiment of the present invention, and FIG. 5 is a state diagram illustrating flow of magnetic force between the magnet and the top plate of the speaker as illustrated in FIG. 3 according to an exemplary embodiment of the present invention.

As illustrated in FIGS. 3 through 5, the speaker 100 for a mobile communication terminal according to the embodiment of the present invention has an upper case 110, a frame 112, a vibration plate 130, a voice coil 132, magnets 122 and 122a, and top plates 124, 124a and 126. Further, the speaker 100 comprises a sound emission hole 115 for emitting sound pressure (ring back tone) generated by the vibration plate 130 to one side of the upper case 110, and a sound pressure adjustment hole 111 for simultaneously and partially emitting the sound pressure (ring back tone) generated by the vibration plate 130 to the upper side of the upper case 110. The sound pressure adjustment hole 111 is formed in the upper case 110, and reduces the sound pressure reflected from the inner surface the upper case 110, thereby preventing the sound pressure from affecting the vibration plate 130. In this way, it is possible to elevate the sound quality of the speaker 100.

The upper case 110 is oppositely coupled to the frame 112, and accommodates the vibration plate 130, the voice coil 132, the magnets 122 and 122a, and the top plates 124, 124a and 126.

The vibration plate 130, the voice coil 132, the magnets 122 and 122a, and the top plates 124, 124a and 126 are combined to form a sound generator 120 for generating the sound pressure (ring back tone).

The vibration plate 130 is fixed to the upper end portion of the frame 112, and generates the sound pressure (ring back tone) while vibrating upward and downward by electromagnetic force (magnetic field) generated when electric current is applied to the voice coil 132.

The voice coil 132 is provided between the magnets 122 and 122a in a state of being fixed to the lower end of the vibration plate 130, and generates the electromagnetic force by using applied electric current, thereby causing the vibration of the vibration plate 130.

The magnets 122 and 122a are provided in the middle portion and inner circumferential portion of the frame 112, respectively, in a state of being spaced from each other, the upper top plates 124 and 124a are provided on the upper ends of the magnets 122 and 122a, respectively, and the lower top plate 126 is provided on the lower ends of the magnets 122 and 122a, thereby forming a magnetic path.

A printed circuit board (PCB) 136 for applying power source to the sound generator 120 having the construction as described above may be formed on a circuit board of the terminal itself. In the present embodiment, the PCB 136 is provided on the outer circumference of the frame 112.

When the upper case 110 and the frame 112 are coupled, the sound emission hole 115 is formed through one side surface of the housing of the upper case 110 and the frame 112. The sound emission hole 115 emits the sound pressure (ring back tone) generated by the vibration plate 130 to one side of the upper case 110. Further, the upper case 110 and the frame 112 are coupled, thereby forming a rectangular resonance neck 114 for guiding the sound pressure (ring back tone) from the sound generator 120 to the sound emission hole 115.

A screen 117 is provided in one end of the resonance neck 114 to prevent fine dust from permeating into the inside of the upper case 110 and the frame 112 through the sound emission hole 115. Further, the screen 117 adjusts the flux of air emitted to the outside through the sound emission hole 115 and harmonizes high and low frequency sound, thereby improving sound quality.

In a state in which the upper case 110 and the frame 112 are not coupled, the resonance neck 114 and the sound emission hole 115 are not formed. However, the upper case 110 and the frame 112 are coupled oppositely to each other, and are engaged with a coupling member 116 made from rubber, so that the resonance neck 114 and the sound emission hole 115 are formed, and the upper case 110 and the frame 112 are firmly joined.

In the meantime, the sound pressure adjustment hole 111 has a diameter of about 0.15 to 0.4 mm, and also emits the sound pressure (ring back tone) generated by the vibration plate 130 to the upper side of the upper case 110 at the same time.

The sound pressure adjustment hole 111 is formed, thereby reducing the effect by the sound pressure (ring back tone) affecting the vibration plate 130 again after being reflected by the inner surface of the upper case 110. That is, the sound pressure (ring back tone) reflected by the inner surface of the upper case 110 affects the vibration plate 130 again. According to the present invention, the sound pressure adjustment hole 111 is formed in the speaker 100, so that the sound pressure (ring back tone) affecting the vibration plate 130 can be reduced.

In forming the sound pressure adjustment hole 111 in the upper case 110, when the sound pressure adjustment hole 111 is set to have a diameter of less than 0.15 mm, the sound pressure (ring back tone) generated by the vibration plate 130 is not smoothly emitted through the sound pressure adjustment hole 111. This may cause an increase in the pressure of the sound pressure (ring back tone) in the sound pressure adjustment hole 111 and thus generate unintended noise. Further, most of the sound pressure (ring back tone) generated by the vibration plate 130 is reflected by the inner surface of the upper case 110 and affects the vibration plate 130 again, so that the characteristics of low frequency sound of the sound pressure (ring back tone) may deteriorate.

In contrast, when the sound pressure adjustment hole 111 is set to have a diameter of greater than 0.4 mm, sufficient sound pressure (ring back tone) generated by up and down vibration of the vibration plate 130 is emitted to the upper side of the upper case 110 through the sound pressure adjustment hole 111, so that the sound pressure emitted to the sound emission hole 115 is reduced. Therefore, the sound pressure (ring back tone) desired by a user, for example, the sound in which high frequency sound and low frequency sound are harmonically mixed, is not emitted.

Accordingly, when the sound pressure adjustment hole 111 has a diameter of about 0.15 to 0.4 mm, the speaker 100 can output the sound in which high frequency sound and low frequency sound are well harmonized, and the sound pressure (ring back tone) properly distributed to each of the sound emission hole 115 and the sound pressure adjustment hole 111 is output.

Hereinafter, the structure of the speaker 100 will be described again. The upper case 110 and the frame 112 are firmly joined by the coupling member 116 to form a single housing, and the resonance neck 114 having a straight line shape and the sound emission hole 115 are respectively formed on one side of the housing. In addition, a magnet engagement groove 113 is formed in the inner circumference of the frame 112, so as to provide a space for mounting the magnet 122a, and another magnet is mounted in the inside of the magnet 122a. Hereinafter, the ring-type magnet mounted in the magnet engagement groove 113 will be referred to as an outer magnet, and the magnet mounted on the inside of the magnet 122a will be referred to as an inner magnet.

The top plate 124a is attached to the magnet 122a by the magnetic force of the magnet 122a, the top plate 124 is attached to the magnet 122 by the magnetic force of the magnet 122, and the top plate 126 is attached to the magnets 122 and 122a by the magnetic force of the magnets 122 and 122a, respectively.

In this way, all parts, excluding one side of the upper case 110 and the frame 112, in which the sound pressure adjustment hole 111 and the sound emission hole 115 are formed, have a sealed structure.

In the meantime, a lower emission hole for emitting the sound pressure (ring back tone) generated by the vibration plate 130 to the downside of the frame 112 and the lower top plate 126 may be formed on the frame 112 or the lower top plate 126. If the lower emission hole is formed on the frame 112 or the lower top plate 126, a screen is provided in the lower emission hole as in the case of the screen 117 provided in the sound emission hole 115, so that it is possible to prevent fine dust from permeating into the inside of the upper case 110 and the frame 112. In addition, it is possible to adjust the flux of air emitted through the lower emission hole and thus provide high quality sound pressure (ring back tone).

Further, a resonance space A, which causes the sound pressure (ring back tone) emitted through the sound pressure adjustment hole 111 to resonate in order to improve the characteristics of low frequency sound, is formed on the outer circumference of the upper case 110. Herein, the resonance space A is formed on the upper end of the upper case 110 by providing a gasket 134 shaped like a circular ring, a rectangular ring or an elliptic ring.

As described above, the sound pressure adjustment hole 111 is formed, so that it is possible to prevent the sound pressure (ring back tone) reflected by the inner surface of the upper case 110 from affecting the vibration plate 130. Further, the gasket 134 is provided on the outer circumference of the upper case 110, so that it is possible to cause the sound pressure (ring back tone) emitted through the sound pressure adjustment hole 111 to resonate. Consequently, the characteristics of low frequency sound can be improved.

According to an exemplary implementation, the vibration plate 130 is a thin plate shaped like a wave, and has the voice coil 132 thereunder. If electric current is applied to the voice coil 132, electromagnetic force is formed around the voice coil 132. As such electromagnetic force interacts with the magnets 122 and 122a, the voice coil 132 and the vibration plate 130 vibrate the air around them while vibrating upward and downward, thereby generating the sound pressure (ring back tone).

Each of the magnets 122 and 122a may be classified as the inner magnet 122 shaped like a disk and the outer magnet 122a shaped like a circular ring. The inner magnet 122 is attached to the middle portion of the frame 112, in detail, the middle portion of the lower top plate 126, and the outer magnet 122a is attached to the inner circumference of the frame 112, for example, the concave-type magnet engagement groove 113, together with the edge portion of the lower top plate 126. Accordingly, the inner magnet 122 is attached to the lower top plate 126 while being surrounded by the outer magnet 122a. In this way, the magnets 122 and 122a are provided apart from each other, so that a magnetic circuit is formed due to magnetic force therebetween as illustrated in FIG. 5.

Herein, the upper top plate 124a is attached to the magnet 122a, the upper top plate 124 is attached to the magnet 122, the lower top plate 126 is attached to the magnets 122 and 122a, and the upper top plates 124 and 124a are spaced from the lower top plate 126, so that the magnetic path is formed.

Hereinafter, an operation process of the speaker for a mobile communication terminal according to an exemplary embodiment of the present invention will be described.

Figure 6:
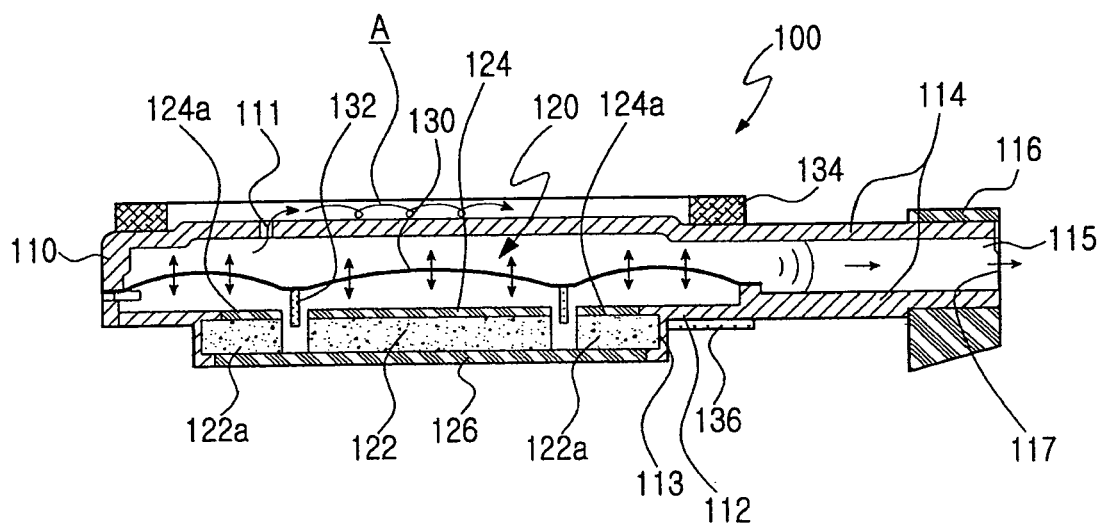
FIG. 6 is a sectional view illustrating the operation process of the speaker for a mobile communication terminal as shown in FIG. 3 according to an exemplary embodiment of the present invention.
Figure 7:
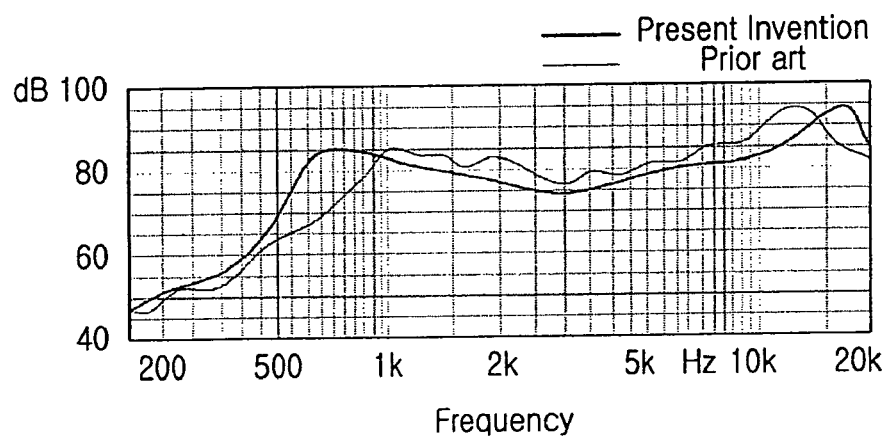
FIG. 7 is a graph illustrating a comparison of frequency response characteristics between the speaker as shown in FIG. 3 according to an exemplary embodiment of the present invention and a conventional speaker.

FIG. 6 is a sectional view illustrating the operation process of the speaker for a mobile communication terminal as shown in FIG. 3 according to an exemplary embodiment of the present invention, and FIG. 7 is a graph illustrating a comparison of frequency response characteristics between the speaker according to an exemplary embodiment of the present invention as shown in FIG. 3 and a conventional speaker.

If the speaker 100 is powered on, in detail, if the PCB 136 is powered on, the PCB 136 applies electric current to the voice coil 132. Then, the voice coil 132 generates electromagnetic force, and such electromagnetic force interacts with electromagnetic force of the magnets 122 and 122a. In this way, the voice coil 132 vibrates together with the vibration plate 130. As the vibration plate 130 vibrates, the adjacent air also vibrates. Accordingly, the sound pressure (ring back tone) is generated.

The sound pressure (ring back tone) generated by vibration of the vibration plate 130 is emitted through the sound emission hole 115 via the resonance neck 114. Some of the sound pressure (ring back tone) is also emitted to the upper side of the upper case 110 through the sound pressure adjustment hole 111 formed on the upper case 110.

Some of the sound pressure (ring back tone) emitted through the sound pressure adjustment hole 111 resonates within the resonance space A, for example, the space formed by providing the gasket 134, thereby attenuating the intensity of the sound pressure (ring back tone) reflected by the inner surface of the upper case 110. In this way, it is possible to prevent the reflected sound pressure (ring back tone) from affecting the vibration plate 130. Consequently, it is possible to activate the characteristics of low frequency sound of the sound pressure (ring back tone) according to smooth vibration of the vibration plate 130.

Comparing the speaker 100 according to an exemplary embodiment of the present invention with the speaker according to the prior art with reference to FIG. 7, it can be understood that the speaker 100 according to an exemplary embodiment of the present invention outputs sound over a wider frequency band as compared with the speaker according to the prior art. Specifically, it can be understood that sound strength is improved in a sound frequency band greater than 500 Hz and less than 1 KHz within a low frequency sound range.

According to a speaker for a mobile communication terminal of an exemplary embodiment of the present invention as described above, a sound emission hole is formed on one side of an upper case and a frame accommodating a sound generator, so that it is possible to elevate the degree of space utilization in the mobile communication terminal. In addition, it is possible to easily manufacture a mobile communication terminal which parallels the miniaturization, slimness and lightness trend. Further, the sound emission hole is formed on one side of the upper case and the frame, and both a sound pressure adjustment hole and a resonance space in communication with the sound pressure adjustment hole are formed on the upper end of the upper case 110, so that it is possible to attenuate sound pressure reflected by the inner surface of the upper case and thus to smoothen vibration of a vibration plate. In this way, the characteristics of low frequency sound of the speaker is improved. As a result, the sound quality of the speaker can be improved.

Although the present invention have been shown and described with reference to certain embodiments thereof, it will be understood by those skilled in the art that various modifications, additions and substitutions in form and details may be made therein without departing from the scope and spirit of the invention as disclosed in the accompanying claims, including the full scope of equivalents thereof.

What is claimed is:

1. A speaker for a mobile communication terminal including an upper case, a frame, a vibration plate, a voice coil, a magnet, a top plate and a printed circuit board (PCB), the speaker comprising:
    a housing for accommodating the vibration plate, the voice coil, the yoke, the magnet and the top plate, the housing being formed by coupling the upper case and the frame;
    a sound emission hole formed in one side surface of the housing;
    a sound pressure adjustment hole formed by penetrating the upper case; and
    a resonance space formed over an outer circumference of the upper case in order to surround the sound pressure adjustment hole.

2. The speaker as claimed in claim 1, wherein the resonance space is formed by a gasket attached to the outer circumference of the upper case, and surrounds the sound pressure adjustment hole.

3. The speaker as claimed in claim 2, wherein the gasket comprises at least one of a circular ring shape, a rectangular ring shape and an elliptic ring shape.

4. The speaker as claimed in claim 1, wherein the sound pressure adjustment hole is formed through the upper case, and has a diameter of 0.15 to 0.4 mm.

5. The speaker as claimed in claim 1, further comprising a magnet engagement groove formed on an inner circumference of the frame, wherein the magnet comprises an outer magnet mounted in the magnet engagement groove, and an inner magnet surrounded by and spaced from the outer magnet.

6. The speaker as claimed in claim 5, wherein the top plate comprises:
    upper top plates attached to upper ends of the inner magnet and the outer magnet; and
    a lower top plate to which the inner magnet and the outer magnet are attached.

7. The speaker as claimed in claim 6, wherein the upper top plates and the lower top plate are provided at a predetermined interval while interposing the inner magnet and the outer magnet therebetween, so that a magnetic path is formed.

8. A speaker for a mobile communication terminal including an upper case, a frame, a vibration plate, a voice coil, a magnet, a top plate and a printed circuit board (PCB), a housing for accommodating the vibration plate, the voice coil, the yoke, the magnet and the top plate, the housing being formed by coupling the upper case and the frame, the speaker comprising:
    a sound pressure adjustment hole formed by penetrating the upper case;
    wherein the sound pressure adjustment hole is formed through the upper case, and has a diameter of 0.15 to 0.4 mm.

9. The speaker as claimed in claim 8, wherein a sound emission hole formed in one side surface of the housing, the speaker comprising:

a resonance space formed in an outer circumference of the upper case in order to surround the sound pressure adjustment hole.

10. A speaker for a mobile communication terminal including an upper case, a frame, a vibration plate, a voice coil, a magnet, a top plate and a printed circuit board (PCB), a housing for accommodating the vibration plate, the voice coil, the yoke, the magnet and the top plate, the housing being formed by coupling the upper case and the frame, a sound emission hole formed in one side surface of the housing, the speaker comprising:

a sound pressure adjustment hole formed by penetrating the upper case; and a resonance space formed over an outer circumference of the upper case in order to surround the sound pressure adjustment hole.

* * * * *